United States Patent [19]

Rosenfeld

[11] 3,945,257

[45] Mar. 23, 1976

[54] FORCE BALANCE TRANSMITTER AND METHOD OF MAKING THE SAME

[75] Inventor: Jacob R. Rosenfeld, Roslyn, Pa.

[73] Assignee: Robertshaw Controls Company, Richmond, Va.

[22] Filed: July 12, 1974

[21] Appl. No.: 487,864

[52] U.S. Cl. ................................ 74/17.8; 74/519
[51] Int. Cl.² .......................................... F16J 15/50
[58] Field of Search ............ 74/17.8, 519, 18, 18.1, 74/469, 388 R, 99 R; 340/187

[56] References Cited
UNITED STATES PATENTS
2,913,909  11/1959  Schweitzer ..................... 74/17.8 X Primary Examiner—Samuel Scott
Assistant Examiner—Frank H. McKenzie, Jr.
Attorney, Agent, or Firm—Candor, Candor & Tassone

[57] ABSTRACT

A force balance transmitter having a substantially flat base plate detachably carrying a primary unit and a secondary unit on an upper substantially flat surface thereof. A bell crank flexure pivot operatively interconnects a primary arm of the primary unit to a secondary arm of the secondary unit.

22 Claims, 6 Drawing Figures

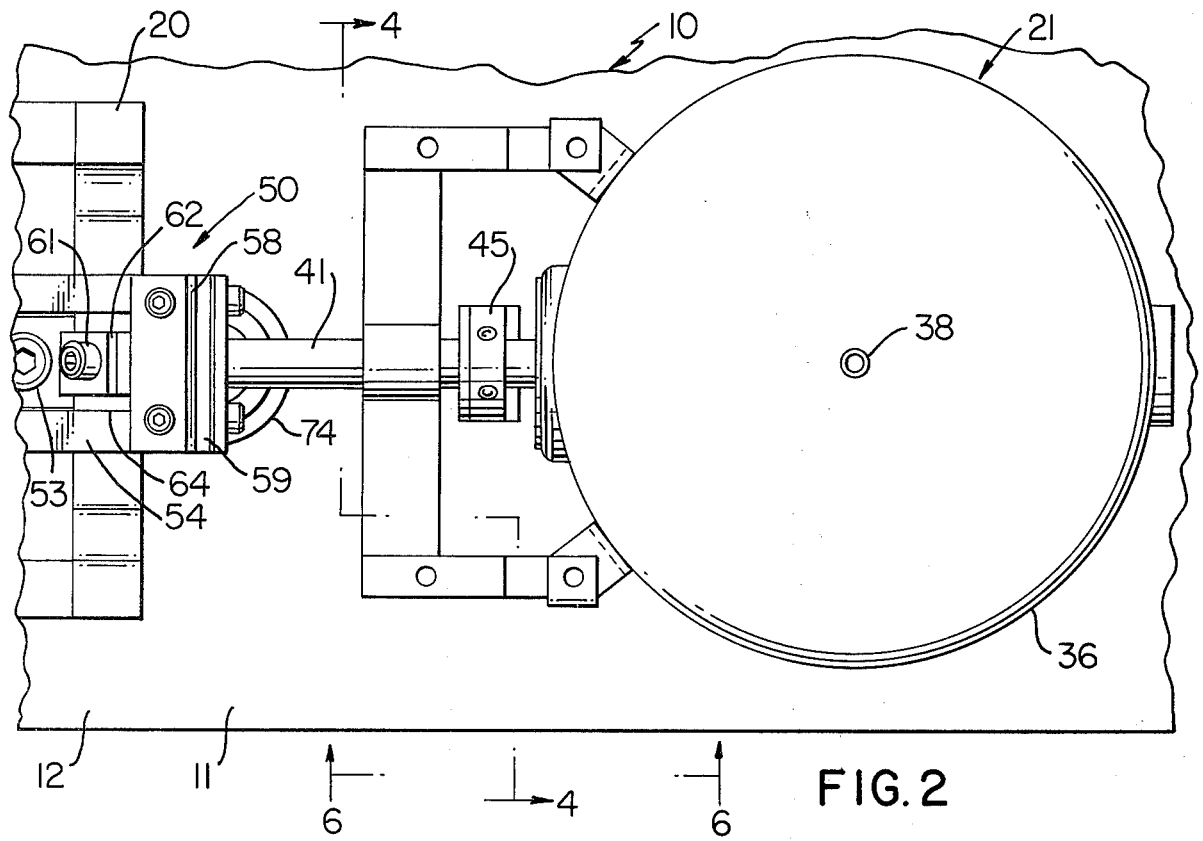
FIG. 2
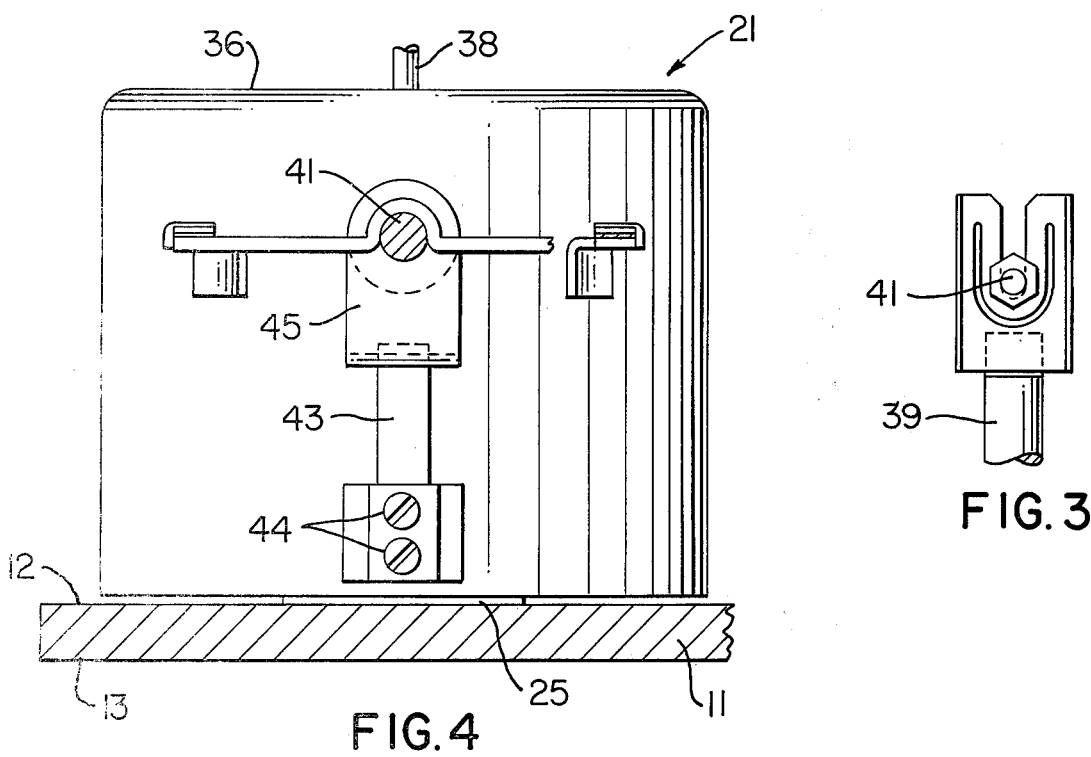
FIG. 4
FIG. 3

FORCE BALANCE TRANSMITTER AND METHOD OF MAKING THE SAME

This invention relates to an improved force balance transmitter and to a method of making the same or the like.

It is well known from the patent to Rosenfeld et al., U.S. Pat. No. 3,749,109, that a force balance transmitter can be provided wherein a relay module of a secondary unit of the force balance transmitter can readily be removed from such transmitter and a new relay module substituted therefor with such relay module being precalibrated so that the same can effectively be utilized with any force balance transmitter that is constructed to accomodate the same.

However, it has been found according to the teachings of this invention that a force balance transmitter can now be provided wherein both the complete secondary unit and the complete primary unit can be detachably secured to a base plate means so that each unit can be readily replaced in the field or the like with a precalibrated unit and the same will be compatible with the remaining unit of the transmitter to operate with the remaining unit in the desired manner.

In particular, one embodiment of this invention provides a force balance transmitter having a base plate means provided with a substantially flat upper surface. A primary unit is detachably secured to the flat surface of the base plate means and has a primary pivot arm. A secondary unit is also detachably secured to the flat surface of the base plate means and has a secondary pivot arm. A bell crank flexure pivot means of this invention operatively interconnects the primary arm and a secondary arm together whereby either the primary unit or the secondary unit or both units can be readily replaced should the same become defective and the replacing unit will be compatible with the remaining unit.

Accordingly, it is an object of this invention to provide an improved force balance transmitter having one or more of the novel features set forth above or hereinafter shown or described.

Another object of this invention is to provide a method of making such a force balance transmitter or the like.

Other objects, uses and advantages of this invention are apparent from a reading of this description which proceeds with reference to the accompanying drawings forming thereof and wherein:

FIG. 2 is a fragmentary cross-sectional view taken substantially on line 2—2 of FIG. 1.

FIG. 3 is a fragmentary cross-sectional view taken on line 3—3 of FIG. 1.

FIG. 4 is a fragmentary cross-sectional view taken substantially on line 4—4 of FIG. 2.

Figure 1:
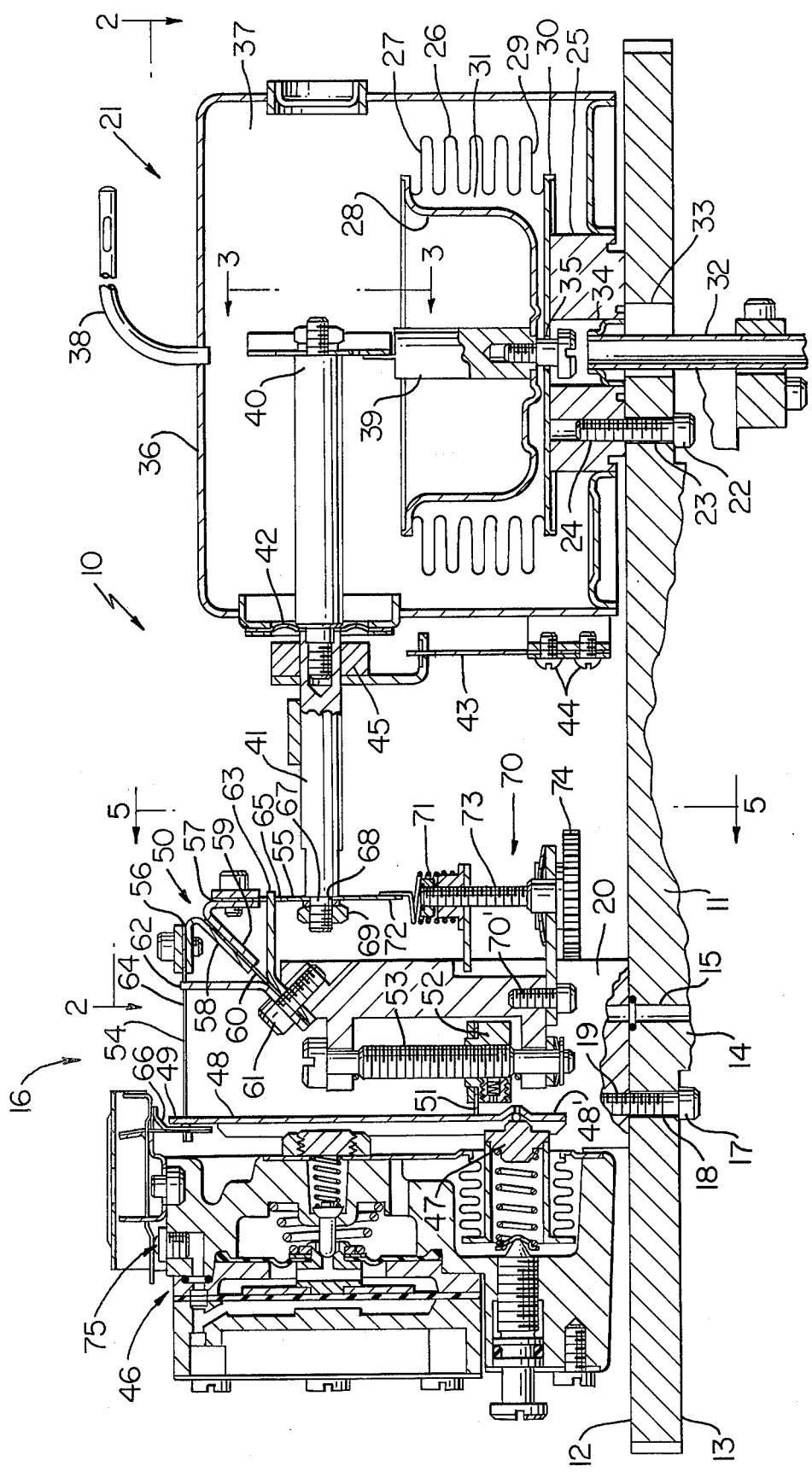
FIG. 1 is a cross-sectional view of the improved force balance transmitter of this invention.
Figure 5:
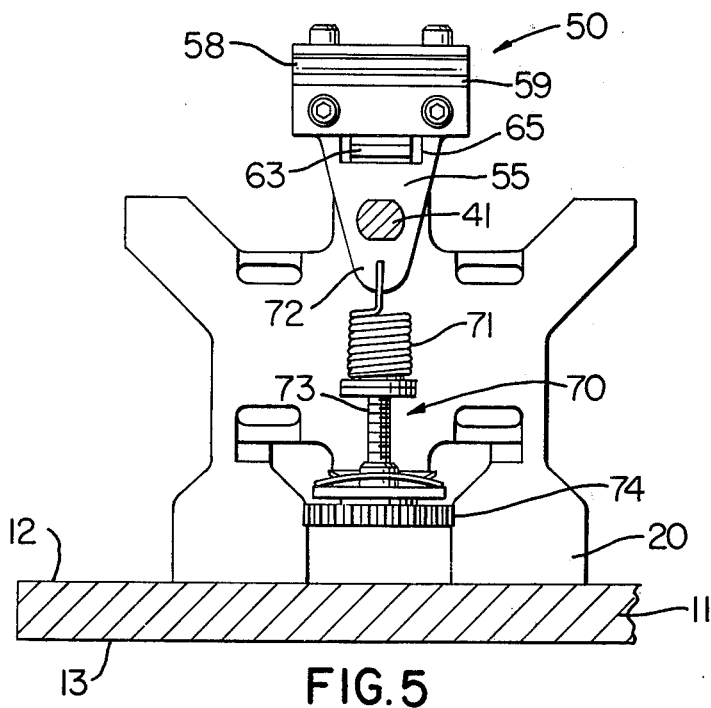
FIG. 5 is a fragmentary cross-sectional view taken on line 5—5 of FIG. 1.
Figure 6:
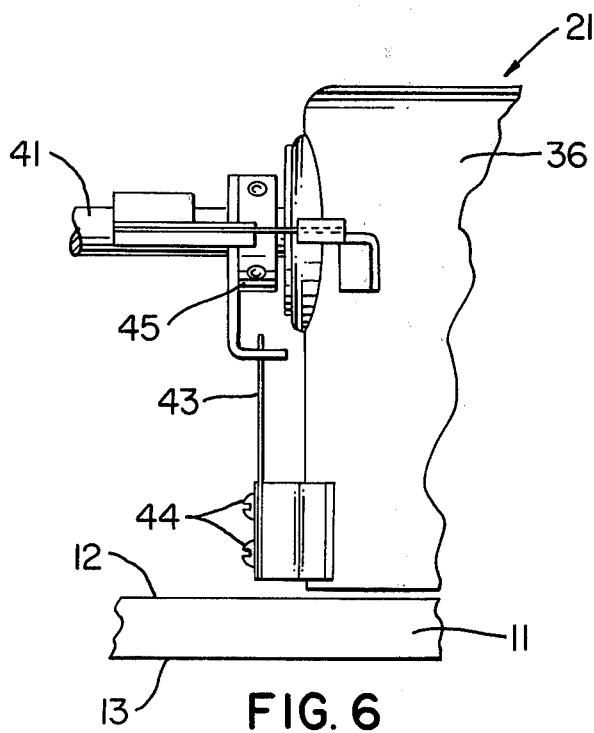
FIG. 6 is a fragmentary elevation view taken substantially in the direction of the arrows 6—6 of FIG. 2.

While the various features of this invention are hereinafter described and illustrated as being particularly adaptable to provide a force balance transmitter of the pneumatic type, it is to be understood that the various features of this invention can be utilized singly or in any combination thereof to provide a force balance transmitter of other types such as electronic, as desired.

Therefore, this invention is not to be limited to only the embodiment illustrated in the drawings, because the drawings are merely utilized to illustrate one of the wide variety of the uses of this invention.

Refering now to FIG. 1, the improved force balance transmitter of this invention is generally indicated by the reference numeral 10 and comprises a base plate means 11 having upper and lower substantially flat surface means 12 and 13 with the lower surface means 13 including a large base part 14 for supporting the base plate 11 in the position illustrated on the desired supporting structure, the large section 14 of the base plate means 11 including passage means 15 for directing pneumatic fluid through the base plate means 11 for controlling a secondary unit that is generally indicated by the reference numeral 16 and is detachably secured to the upper surface 12 of the base plate means 11 by threaded fastening members 17 passing through opening means 18 in the base plate means 11 and being threadedly received in threaded bores 19 of a frame part 20 of the secondary unit 16 as illustrated.

Similarly, a primary unit of the transmitter 10 is generally indicated by the reference numeral 21 and is detachably secured to the upper surface 12 of the base plate means 11 by threaded fastening members 22 passing through opening means 23 in the base plate means 11 and being threadedly received in threaded bores 24 formed in a frame part 25 of the primary unit 21.

The primary unit 21 includes a bellows construction 26 having one end 27 closed by a cup-shaped member 28 and the other end 29 closed by an end plate 30 secured to the frame member 21 whereby a chamber 31 is defined in the bellows construction 26 and is fluidly interconnected to a conduit 32 secured to the base plate means 11 and projecting through an opening 33 in the base plate means 11, an opening 34 in the frame member 25 and disposed in fluid communication with an opening 35 formed in the end plate 30 as illustrated whereby a pneumatic control pressure source is adapted to be interconnected to the interior 31 of the bellows construction 26 by the conduit means 32 for a purpose hereinafter described.

The frame member 25 of the primary unit 21 includes a surrounding casing 36 which cooperates with the frame member 25 to define a sealed chamber 37 outboard of the bellows construction 26 and adapted to be evacuated through a conduit means 38 in a conventional manner whereby the bellows construction 26 is adapted to be surrounded by a vacuum condition.

The cup-shaped member 28 of the bellows construction 26 carries a post means 39 that is interconnected to one end 40 of a pivotally mounted primary arm 41 of the primary unit 21, the primary arm 41 being pivotally mounted by a flexible seal 42 of the casing 36 so that up and down movement of the end 27 of the bellows construction 26 upon changes in the pressure differential across the same will cause pivoting action of the primary arm 41 about the flexible seal 42.

An ambient temperature compensating bimetal member 43 is attached by fastening means 44 to the casing 36 of the primary unit 21 and is interconnected to a bracket means 45 disposed in telescoping relation on the primary arm 41 to tend to cause pivoting action of the primary arm 41 in response to ambient temperature changes which offset like ambient temperature changes in the setting of the bellows construction 26 to maintain the primary arm 41 in a position determined solely by the pressure differential acting across the bellows construction 26 as will be apparent hereinafter.

The secondary unit 16 includes a pneumatically operated relay module that is generally indicated by the reference numeral 46 and is basically of the same type as the relay module set forth in the aforementioned U.S. Pat. to Rosenfeld et al., No. 3,749,109, whereby the particular details of the structure and operation of the same can be obtained by referring to such U.S. patent which is incorporated by reference into this application. Also, see copending patent application Ser. No. 331,337, filed Feb. 9, 1973, for structural changes in the relay module of the aforementioned U.S. patent that are incorporated in the relay module 46 of the transmitter 10 of this invention.

In any event, it can be seen that the relay module 46 has a pneumatically operated piston member 47 bearing against a lower end 48' of a pivotally mounted secondary arm 48 of the secondary unit 16 that has its upper end 49 operatively interconnected to the primary arm 41 of the primary unit 21 by a bell crank flexure pivot means of this invention that is generally indicated by the reference numeral 50, the secondary arm 48 being pivotally mounted against an adjustable fulcrum point 51 carried by the frame unit 20 and comprising a nut-like structure 52 threadedly disposed on a threaded member 53 rotatably mounted to the frame structure 20 whereby the fulcrum point 51 can be adjusted upwardly and downwardly on the threaded member 53 by turning the threaded member 53 in a conventional manner.

The bell crank flexure pivot means 50 connects a pair of flexure arms 54 and 55 respectively operatively interconnected to the secondary arm 48 and the primary arm 41 in a manner hereinafter described and disposed at substantially a right angle relative to each other by having adjacent ends 56 and 57 thereof secured to a pair of angled members 58 and 59 sandwiching another flexure arm 60 therebetween at an angle that substantially bisects the right angle of the flexure arms 54 and 55. The flexure arm 60 is secured to the frame structure 20 of the secondary unit 16 by a threaded fastening member 61 whereby the arms 54 and 55 are flexibly mounted by the flexure member 60 to the frame 20 in pivot manner. However, a pair of stop members 62 and 63 are respectively secured in sandwiching fashion with the flexure arm 60 to the frame structure 20 by the threaded fastening member 61 with the stop members 62 and 63 respectively projecting through openings 64 and 65 formed in the flexure arms 54 and 55 so as to limit movement thereof in a pivoting manner about the flexure arm 60 as will be apparent hereinafter.

The flexure 54 is attached to the upper end 49 of the secondary arm 48 and is operatively interconnected to a flexure member 66 that is carried on the relay module 46 whereby movement of the flexure arm 54 to the right in FIG. 1 tends to cause the arm 48 to pivot in a clockwise manner on the pivot point 51 and oppose outward movement of the piston 47 of the relay module 46. Conversely, movement of the flexure arm 54 to the left in FIG. 1 tends to cause the secondary arm 48 to pivot in a counterclockwise direction on the adjustable fulcrum point 51 by the force of the piston 47 tending to move outwardly and, thus, to the right in FIG. 1.

The other flexure arm 55 which is part of a bias adjustment means 70 is detachably secured to the primary arm 41 of the primary unit 21 by having a reduced end 67 of the primary arm 41 projected through an opening 68 in the flexure member 55 and be secured thereon by a fastening nut 69 and is the means by which the primary unit 21 is disconnected from the secondary unit 16.

The bias adjustment means 70, which includes the flexure 55, is connected at one end to the frame 20 of the secondary unit by fasteners 70' and is connected to the bell crank 50 at the other end to bell crank 50 by the end 57 of the flexure 55, the bias adjustment means having a tension spring means 71 operatively interconnected to the lower end 72 of the flexure arm 55 and being adjustable in its tension force being imposed on the flexure arm 55 by a threaded adjusting member 73 having an adjusting knob 74 on the lower end thereof. Thus, by rotating the adjusting nut 74 in the desired direction, the force of the tension spring 71 can be increased or decreased in its action tending to pull downwardly on the flexure arm 55 to be opposed by the force of the spring means and the pneumatic pressure in the relay module 46 in a manner conventional in the art.

Therefore, it can be seen that the force balance transmitter of this invention can be formed from a plurality of uniquely formed parts to be attached to the base plate means 11 as units 16 and 21 in a simple and effective manner to operate in a manner now to be described.

It is well known that a force balance transmitter tends to maintain the secondary lever 48 in substantially a true vertical position by having the relay construction 46 tend to increase or decrease the pneumatic force acting on the piston 47 to oppose the changes in the movement of the primary arm 41 caused by changes in the pressure differential across the bellows construction 26 so that the relay construction 46 will provide an output pressure corresponding to the pressure differential across the bellows construction 26.

Thus, as the pressure in the bellows construction 26 increases by the control pressure being fed thereto through the conduit 32 increasing, the same tends to move the cup-shaped member 28 upwardly and, thus, cause counterclockwise pivoting movement of the primary arm 41 to tend to pull downwardly on the flexure arm 55 and, thus movement of the flexure arm 54, through the bell crank flexure pivot means 50, to the right and thereby tend to cause clockwise pivoting movement of the secondary arm 48 about the fulcurm point 51. However, such tendency of the upper end 49 of the secondary arm 48 to tend to move to the right in FIG. 1 is transmitted through the flexure means 66 and is sensed by a nozzle means 75 of the relay construction 46 whereby the relay construction 46 increases the pneumatic pressure being directed to the piston 47 to thereby oppose such clockwise pivoting movement of the lever 48 so that the lever 48 is maintained in the substantially vertical position, the relay construction 46 now sending a signal corresponding to the change in the pressure now being required in the relay construction 46 to counter-balance the change in the pressure differential across the bellows construction 26.

Conversely, should the pressure in the bellows construction 26 decrease, the bellows construction 26 tends to collapse whereby downward movement of the cup-shaped member 28 causes clockwise pivoting movement of the primary pivot arm 41 to thereby move the flexure arm 55 upwardly and, through the bell crank flexure pivot means 50, cause movement of the flexure arm 54 to the left to tend to cause counterclockwise movement of the secondary pivot arm 48 about the fulcrum point 51. Such counterclockwise pivoting movement of the secondary arm 48 is sensed by the nozzle means 75 whereby the relay construction 46 decreases the pressure acting on the piston 47 maintaining the secondary arm 48 in the vertical condition while the relay construction 46 indicates through its pneumatic signal that the pressure differential across the bellows construction 26 has decreased a certain amount.

Therefore, it can be seen that the force balance transmitter 10 of this invention functions in a conventional manner to maintain the secondary pivot arm 48 in a substantially true vertical position thereof.

However, the force balance transmitter 10 of this invention has the unique feature of permitting either the secondary unit 16 or the primary unit 21 or both to be readily replaced from the base means 11 and have another unit substituted therefor to be attached to the remaining unit by simply removing nut 69 from the primary arm 41 to disconnect the units 16 and 21 from each other so that one or both can be removed from the base means 11, such replacing unit having been precalibrated so that the same can act in the manner previously described to permit the transmitter 10 to perform its desired function.

Therefore, it can be seen that this invention not only provides an improved force balance transmitter, but also that this invention provides an improved method of making such a force balance transmitter or the like.

While the form and method of this invention now preferred have been described and illustrated as required by the Patent Statute, it is to be understood that other forms and method steps can be utilized and still come within the scope of the appended claims.

What is claimed is:

1. A force balance transmitter comprising a base plate means having a substantially flat upper surface, a primary unit detachably secured to said surface of said base plate means and having a primary pivot arm, a secondary unit detachably secured to said surface of said base plate means and having a secondary pivot arm, and means operatively interconnecting said primary arm and said secondary arm together, said means operatively interconnecting said primary arm and said secondary arm together comprising a bell crank flexure pivot means.

2. A force balance transmitter as set forth in claim 2 and including a pair of flexure arms disposed at substantially a right angle relative to each other and respectively being interconnected to said primary arm and said secondary arm, said bell crank flexure pivot means interconnecting said flexure arms together.

3. A force balance transmitter as set forth in claim 3 wherein the flexure arm interconnected to said primary arm forms part of a bias adjusting means.

4. A force balance transmitter as set forth in claim 2 wherein another flexure arm is interconnected to said pair of flexure arms by said bell crank pivot means and substantially bisects the right angle thereof.

5. A force balance transmitter as set forth in claim 2 wherein a pair of stops are respectively disposed adjacent said pair of flexure arms to limit movement thereof.

6. A force balance transmitter as set forth in claim 2 wherein said primary arm and said secondary arm are respectively disposed substantially perpendicular to their respective flexure arms.

7. A force balance transmitter comprising a base means, a primary unit carried by said base means and having a primary pivot arm, a secondary unit carried by said base means and having a secondary pivot arm, and a bell crank flexure pivot means operatively interconnecting said primary arm and said secondary arm together.

8. A force balance transmitter as set forth in claim 7 and including a pair of flexure arms disposed at substantially a right angle relative to each other and respectively being interconnected to said primary arm and said secondary arm, said bell crank flexure pivot means interconnecting said flexure arms together.

9. A force balance transmitter as set forth in claim 8 wherein the flexure arm interconnected to said primary arm forms part of a bias adjusting means.

10. A force balance transmitter as set forth in claim 8 wherein another flexure arm is interconnected to said pair of flexure arms by said bell crank pivot means and substantially bisects the right angle thereof.

11. A force balance transmitter as set forth in claim 8 wherein a pair of stops are respectively disposed adjacent said pair of flexure arms to limit movement thereof.

12. A force balance transmitter as set forth in claim 8 wherein said primary arm and said secondary arm are respectively disposed substantially perpendicular to their respective flexure arms.

13. A force balance transmitter as set forth in claim 8 wherein said primary arm has temperature compensating means carried thereby.

14. A force balance transmitter as set forth in claim 8 wherein said primary arm is detachably secured to its respective flexure arm.

15. A method of making a force balance transmitter comprising the steps of forming a base plate means with a substantially flat upper surface, detachably securing a primary unit to said surface of said base plate means, detachably securing a secondary unit to said surface of said base plate means, and operatively interconnecting a primary arm of said primary unit to a secondary arm of said secondary unit with a bell crank flexure pivot means.

16. A method of making a force balance transmitter as set forth in claim 15 and including the steps of interconnecting a pair of flexure arms respectively to said primary arm and said secondary arm, and interconnecting said flexure arms together at substantially a right angle relative to each other by said bell crank flexure pivot means.

17. A method of making a force balance transmitter as set forth in claim 16 and including the step of forming the flexure arm that is interconnected to said primary arm to be part of a bias adjusting means.

18. A method of making a force balance transmitter as set forth in claim 16 and including the step of interconnecting another flexure arm to said pair of flexure arms by said bell crank pivot means so that said other flexure arm substantially bisects the right angle thereof.

19. A method of making a force balance transmitter as set forth in claim 16 and including the step of disposing a pair of stops respectively adjacent said pair of flexure arms to limit movement thereof.

20. A method of making a force balance transmitter as set forth in claim 16 and including the step of disposing said primary arm and said secondary arm substantially perpendicular to their respective flexure arms.

21. A method of making a force balance transmitter comprising the steps of forming a base means, securing a primary unit to said base means, securing a secondary unit to said base means, and operatively interconnecting a primary arm of said primary unit to a secondary arm of said secondary unit with a bell crank flexure pivot means.

22. A method of making a force balance transmitter as set forth in claim 21 and including the steps of interconnecting a pair of flexure arms respectively to said primary arm and said secondary arm, and interconnecting said flexure arms together at substantially a right angle relative to each other by said bell crank flexure pivot means.

* * * * *